United States Patent Office 3,221,511
Patented Dec. 7, 1965

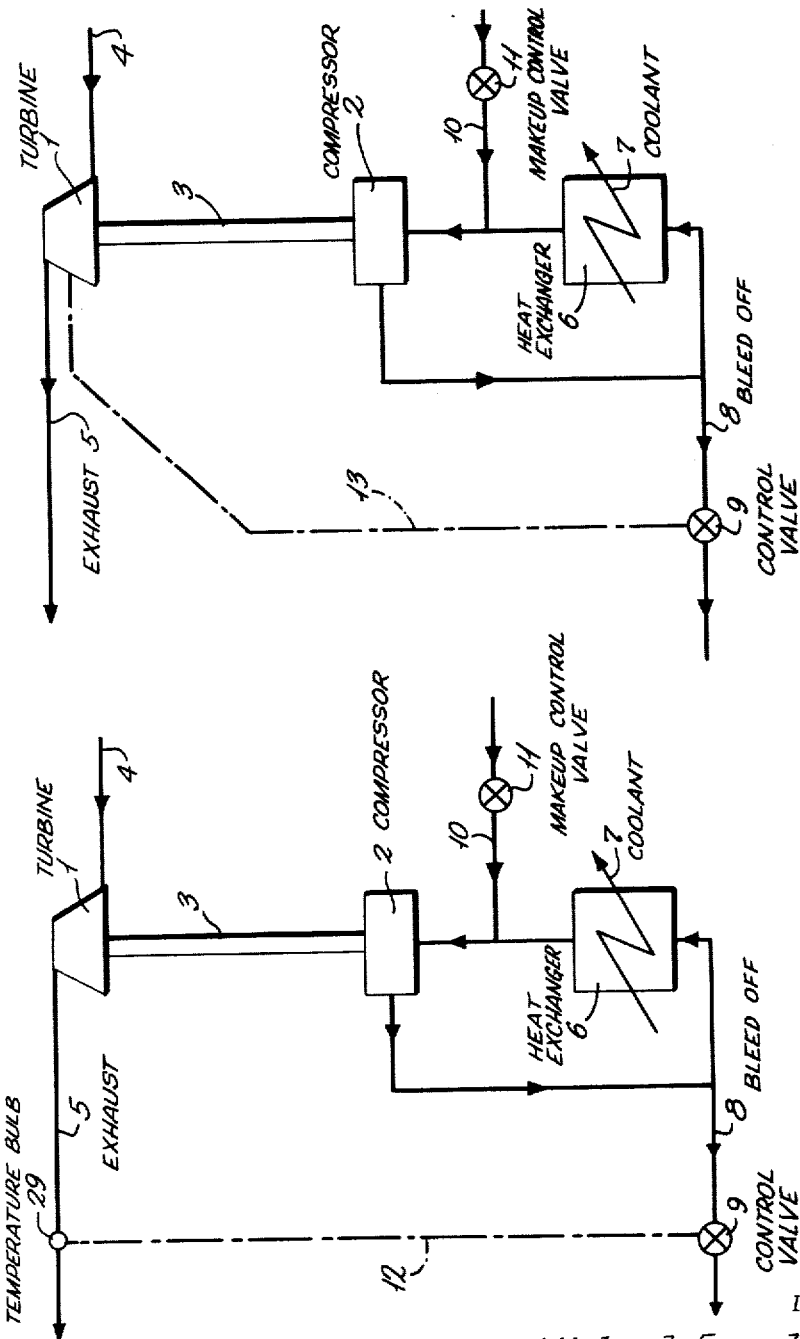

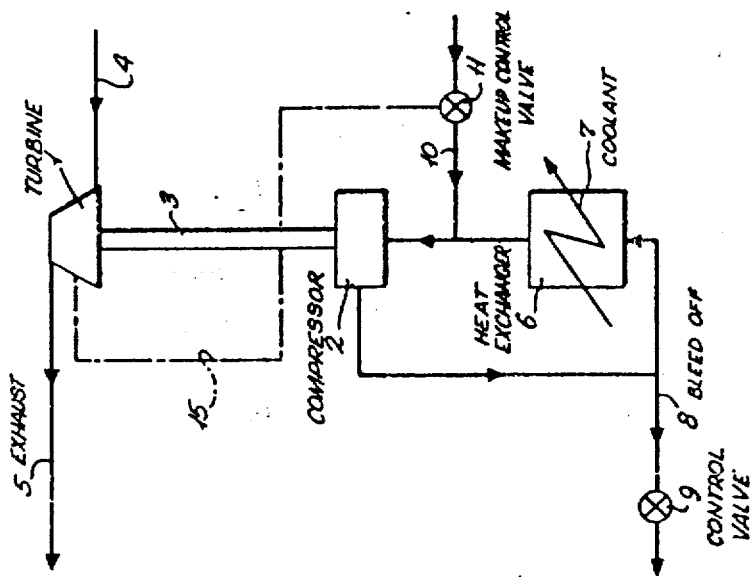
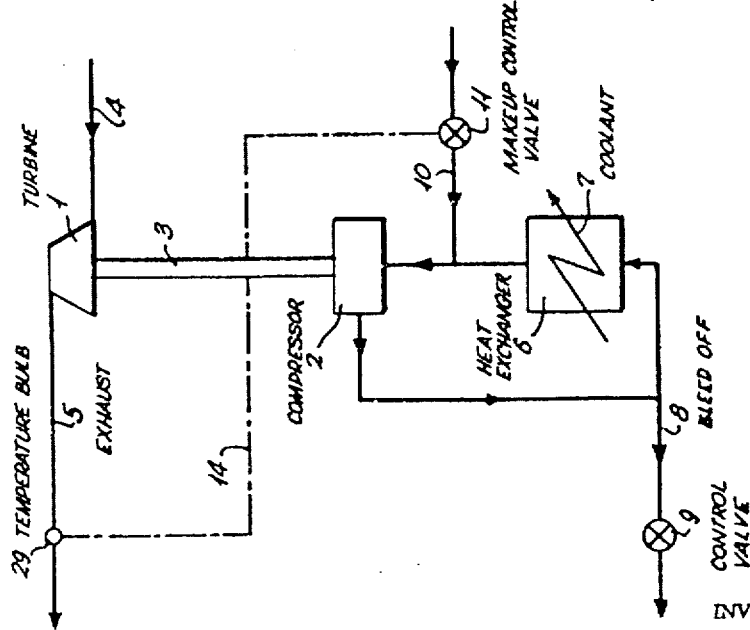

3,221,511
COOLING SYSTEMS FOR GASES
Michael Ernest Garrett, London, England, assignor to The British Oxygen Company Limited, London, England
Filed Dec. 14, 1964, Ser. No. 417,977
12 Claims. (Cl. 62—172)

This invention relates to cooling systems for gases of the type employing an expansion turbine for expanding and cooling the gas and a compressor driven by the turbine.

It has previously been proposed to provide a turbine-compressor unit of this type in which the compressor lies in a closed gas cycle which does not include the turbine but includes a cooler for the gas in the closed gas cycle and a throttling member in series therewith, the speed of the turbine being controlled by suitable adjustment of the throttling member.

According to the present invention, in a cooling system for a gas of the type employing an expansion turbine for expanding and cooling the gas and a compressor driven by the turbine, and in which the compressor lies in a closed gas cycle which does not include the turbine, the closed gas cycle is provided with a controlled bleed-off at the output side of the compressor and a controlled make-up at the input side of the compressor, the pressure in the compressor cycle being controlled by adjustment of the make-up and/or bleed-off.

Preferably, the make-up is held at a fixed value by means of a suitable throttling device, such as an orifice or a pre-set valve, whilst the bleed-off is controlled by an adjustable valve to control the pressure in the compressor cycle. Alternatively, the bleed-off may be fixed and the make-up controlled by an adjustable valve. If desired, both the make-up and bleed-off may be controlled by adjustable valves.

Preferably the setting of the adjustable valve or valves is automatically adjusted in dependence upon a characteristic of the turbine cycle, for example, the temperature or pressure of the turbine exhaust, or the turbine speed, so as to control the pressure in the compressor cycle in such a manner as to maintain the particular characteristic of the turbine cycle substantially constant. In this way, the functioning of the turbine can be rendered largely automatic. The setting of the adjustable valve or valves may be adjusted in accordance with the chosen characteristic of the turbine cycle through any suitable form of linkage, for example, a pneumatic, mechanical or electronic linkage. If desired, the adjustment of the adjustable valve or valves may be effected manually.

The turbine and its associated compressor will normally be mounted on a common shaft and in accordance with a feature of the invention, the adjustable valve or valves may be adjusted to maintain a fixed differential pressure or a function of differential pressure between the turbine cycle and the compressor cycle so that the axial thrusts on the common shaft and due to the pressures in the respective cycles are balanced. Such thrusts would be unequal if the turbine and the compressor cycles were at equal pressures, and to overcome the resultant thrust, an axial thrust bearing would be required. By controlling the differential pressure between the two cycles in accordance with the present invention, such an axial thrust bearing is not required.

The turbine and compressor cycles are quite separate, which eliminates cold losses and enables different gases to be employed in the two cycles, which in some circumstances may be an advantage. It is, of course, possible to use in the compressor cycle the same gas as passes through the turbine.

The closed gas cycle will normally also include a heat exchanger in which the gas leaving the compressor is cooled by heat exchange with an external coolant. This heat exchanger is conveniently located between the bleed-off and make-up lines.

Four forms of cooling systems according to the invention are illustrated diagrammatically in the accompanying drawings, wherein like parts are indicated by the same reference numerals.

FIGURE 1 illustrates diagrammatically the system wherein the pressure in the compressor cycle is controlled by automatically adjusting the valve in the bleed-off line in accordance with variations in the temperature in the turbine exhaust.

FIGURE 2 illustrates a modification wherein the pressure in the compressor cycle is controlled by automatically adjusting the valve in the bleed-off line in accordance with the turbine speed.

FIGURE 3 illustrates another modification wherein the pressure in the compressor cycle is controlled by automatically adjusting the valve in the make-up line in accordance with variations in the temperature in the turbine exhaust, and FIGURE 4 illustrates still another modification wherein the pressure in the compressor cycle is controlled by automatically adjusting the valve in the make-up line in accordance with the turbine speed.

Referring to FIGURE 1, the system includes a turbine 1 and a compressor 2 mounted on a common shaft 3. Gas which is to be expanded and cooled in the turbine 1 enters it through an input line 4 and the cooled and expanded gas leaves the turbine through an exhaust line 5, which has a temperature bulb 29 therein.

The compressor 2 operates in a closed gas cycle including a heat exchanger 6 in which the gas leaving the compressor is cooled by heat exchange with an external coolant, the flow of which through the heat exchanger 6 is indicated at 7.

The compressor cycle is provided with bleed-off line 8 between the compressor exhaust and the heat exchanger 6, controlled by a valve 9, and with a make-up line 10 between the heat exchanger 6 and the compressor inlet, controlled by a valve 11.

The valve 9 is automatically adjustable in dependence upon the pressure or temperature in the turbine exhaust line 5 through a suitable linkage indicated by the chain-line 12.

In operation, the valve 11 controlling the make-up line 10 is maintained at a fixed opening while the valve 9 in the bleed-off line 8 is automatically adjusted through the linkage 12 in accordance with variations in the temperature in the turbine exhaust line 5 from a predetermined value. Should the exhaust pressure or temperature of the turbine vary from the predetermined value, such variation will be transmitted to the valve 9 through the linkage 12 and will cause the valve 9 to open or close to decrease or increase the pressure in the compressor cycle. Such variation of the pressure will change the braking effect of the compressor and hence the speed of the turbine in such a manner that the pressure or temperature in the turbine exhaust is brought back to the predetermined value.

In the embodiment illustrated in FIGURE 2, the arrangement is similar to that of FIGURE 1, except that the valve 9 is controlled directly in accordance with the turbine speed through a suitable linkage indicated by the chain line 14.

Referring now to FIGURE 3, the arrangement is similar to that of FIGURE 1 except that the valve 9 controlling the bleed-off line 8 is maintained at a fixed opening while the valve 11 controlling the make-up line 10 is automatically adjusted in dependence upon the temperature in the turbine exhaust line 5 through a suitable linkage indicated by the chain-line 14.

In the embodiment illustrated in FIGURE 4, the arrangement is similar to that of FIGURE 3, except that the valve 11 is controlled directly in accordance with turbine speed through a suitable linkage indicated by the chain line 15.

What I claim as my invention and desire to secure by Letters Patent of the United States is:

1. A cooling system for a gas comprising an expansion turbine for expanding and cooling the gas, a compressor driven by said turbine, a closed gas cycle including said compressor but not including said turbine, a controlled make-up to said closed gas cycle at the input side of said compressor, a controlled bleed-off from said closed gas cycle at the output side of said compressor and means for varying at least one of said make-up and said bleed-off to control the pressure in said closed gas cycle.

2. A cooling system according to claim 1 wherein said make-up is fixed and wherein said bleed-off is adjustably controlled by means of a valve.

3. A cooling system according to claim 2 wherein said valve is adjusted in dependence upon a characteristic of the turbine cycle to maintain said characteristic substantially constant.

4. A cooling system according to claim 3 wherein said characteristic is the temperature of the turbine exhaust.

5. A cooling system according to claim 3 wherein said characteristic is the turbine speed.

6. A cooling system according to claim 1 wherein said bleed-off is fixed and wherein said make-up is adjustably controlled by means of a valve.

7. A cooling system according to claim 6 wherein said valve is adjusted in dependence upon a characteristic of the turbine cycle to maintain said characteristic substantially constant.

8. A cooling system according to claim 7 wherein said characteristic is the temperature of the turbine exhaust.

9. A cooling system according to claim 7 wherein said characteristic is the turbine speed.

10. A cooling system according to claim 3 wherein said valve is automatically adjusted in dependence upon said characteristic through a suitable linkage.

11. A cooling system according to claim 7 wherein said valve is automatically adjusted in dependence upon said characteristic through a suitable linkage.

12. A cooling system according to claim 1, including a heat exchanger located in the compressor cycle between said bleed-off and said make-up and in which the gas leaving the compressor is cooled by heat exchange with an external coolant.

References Cited by the Examiner

UNITED STATES PATENTS

| | | | |
|---|---|---|---|
| 2,503,250 | 4/1950 | Eckert | 62—172 |
| 2,618,125 | 11/1952 | Fischer | 62—172 |
| 2,851,863 | 9/1958 | Theed | 62—172 |
| 2,923,222 | 2/1960 | Manning | 62—172 |

WILLIAM J. WYE, *Primary Examiner.*